United States Patent [19]

Ollik

[11] 4,321,729

[45] Mar. 30, 1982

[54] APPARATUS FOR ALIGNING FISH

[75] Inventor: Reinhard Ollik, Lübeck, Fed. Rep. of Germany

[73] Assignee: Nordischer Maschinenbau Rud. Baader GmbH Co. & KG, Lubeck, Fed. Rep. of Germany

[21] Appl. No.: 168,200

[22] Filed: Jul. 10, 1980

[30] Foreign Application Priority Data

Feb. 1, 1980 [DE] Fed. Rep. of Germany ....... 3003617

[51] Int. Cl.³ .................... A22C 25/08; A22C 25/14
[52] U.S. Cl. ......................................... 17/63; 198/385
[58] Field of Search .................. 17/55, 61, 63, 52, 53; 198/385

[56] References Cited

U.S. PATENT DOCUMENTS

| 2,563,008 | 8/1951 | Danielsson | 17/55 |
| 2,895,163 | 7/1959 | Danielsson | 17/55 |
| 3,123,853 | 3/1964 | Radloff et al. | 17/63 |
| 4,215,452 | 8/1980 | Nagrotzki | 17/63 X |

FOREIGN PATENT DOCUMENTS 139203 12/1979 Fed. Rep. of Germany .......... 17/63

Primary Examiner—Willie G. Abercrombie
Attorney, Agent, or Firm—Edward F. Levy

[57] ABSTRACT

The invention relates to an apparatus for aligning fish in the position required for decapitation. For this purpose the fish is displaced by means of sprung displacement elements with the point of connection of at least one of its breast fins until the latter engages the catching edge of a brake shoe. The breast fin which is erected thereby is introduced, while being conveyed further, into a gap formed between the brake shoe and a guide track which ensures the guiding of the same and thus of the fish in a well-defined position for decapitation.

9 Claims, 3 Drawing Figures

4,321,729

APPARATUS FOR ALIGNING FISH

BACKGROUND OF THE INVENTION

1. Field of the Invention

The invention relates to a device for aligning fish lying on their side and conveyed perpendicular to their longitudinal axis into the position required for decapitation having a brake shoe provided with a catching edge which slides on the fish body and means for displacing the fish in the direction of their tail end.

2. Description of Prior Art

DE-PS No. 2 619 217 discloses an apparatus in which the fish which are conveyed transverse to their longitudinal axis come into co-operating engagement with an aligning disc which displaces the fish in the direction of their tail portion by engaging their snout by means of sprung head pushers. A brake shoe is lowered in synchronism with the passage of the fish on to the latter so that the braking edge of the brake shoe rests upon the flank of the fish. During the course of the displacement by the head pushers the rear edge of the gill cover reaches the catching edge of the brake shoe so that the displacement movement of the fish is stopped. In the position thus reached the decapitation stroke is carried out.

With this device it is found that with this manner of alignment the desired position can hardly be achieved, at least not with the required exactness. The cause of this is that the pressure of the braking edge against the fish must on the one hand have such a value that the fish is pressed in behind the gill flap so that its rear edge runs securely against the brake shoe and on the other hand should be kept as low as possible since the displacement must occur under the action of this engaging force. If the engaging force of the braking edge against the fish is so set that the gill cover edge runs securely against the brake shoe then the displacing force must be correspondingly high. This entails, however, the danger that the gill cover is compressed or even torn so that a precise positioning is no longer possible. The consideration of these two opposing requirements is satisfactory when processing freshly caught fish; but when processing fish having a softer consistency it is observed that the rear edge of the collar bone or the point of connection of the breast fins function as an opposing edge. This has the consequence that the fish does not reach its optimum decapitation position and therefore the decapitation stroke occurs with an unacceptably high loss of valuable fish meat.

OBJECT OF THE INVENTION

It is therefore a main object of the invention to devise an apparatus which in a simple manner enables a reliable and precise positioning of fish into their optimum position for the decapitation stroke.

BRIEF SUMMARY OF THE INVENTION

This object is achieved in accordance with the invention in that a guide track is associated to the catching edge of the brake shoe and lies upstream of the latter when seen in the displacement direction of the longitudinal axis of the fish, this guide track having a guide edge directed, in use, toward the fish and being set back by a few millimeters in height over at least part of its length with respect to the catching edge, the catching edge and the guide edge enclosing together a gap extending in the conveying direction of the fish.

The advantages achieved thereby reside particularly in that the breast fins which generally lie against the flanks of the fish are loosened from the fish body during the displacement of the fish by means of the catching edge, are erected against the surface defining the gap between the brake shoe and the guide track and are guided in the gap with a lateral engagement of the joints of the breast fins, which safely absorb the displacement pressure, with the catching edge of the brake shoe.

For the purpose of enabling the adjustment to varying sizes of fish the brake shoe can be constructed to be vertically yieldable i.e. yieldable in height. The guide edge of the guide track can also be formed rounded in order to ensure an unimpeded sliding of the same on the fish flank.

The construction of the brake shoe in which the entry end of the catching edge is arranged before the entry of the guide edge of the guide track ensures that the breast fin is loosened from the fish body before its entry into the gap between the brake shoe and guide track so that it can stand up in the said gap during the further displacement of the fish.

In order to facilitate and accelerate the erecting of the breast fins preferably there is provided a first roller vertically yieldably disposed above the conveying means, this roller being spaced from the brake shoe in a direction opposed to the conveying direction, being rotatable about an axis extending substantially parallel to the conveying direction, and having a periphery of which a part, in use, is directed towards the fish, this part of the periphery moving, in use, in a direction opposed to the displacement direction.

The arrangement of a second unit comprising a second brake shoe and second guide track essentially in the surface or plane carrying the fish approximately opposite the first unit comprising the first brake shoe and first guide track permits an increased security of the positioning to be achieved by simultaneously guiding the two opposing breast fins and furthermore makes possible a decapitation stroke extending accurately perpendicular to the backbone of the fish.

To improve this effect further, a second roller is arranged below the plane receiving the fish in a position opposite to the first roller, this second roller being rotatable in a direction opposed to the direction of rotation of the first roller. Advantageously the periphery of the first and second roller may be provided with a roughened surface, whereby the gripping effect of the roller on the breast fin is improved. The roughening can be provided by means of a fine grooving, toothing or the like.

BRIEF DESCRIPTION OF THE DRAWINGS

Other and further objects of the present invention will be apparent from the following description and claims and are illustrated in the accompanying schematic drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings.

DETAILED DESCRIPTION OF THE PREFERRED EMBODIMENT

Figure 1:
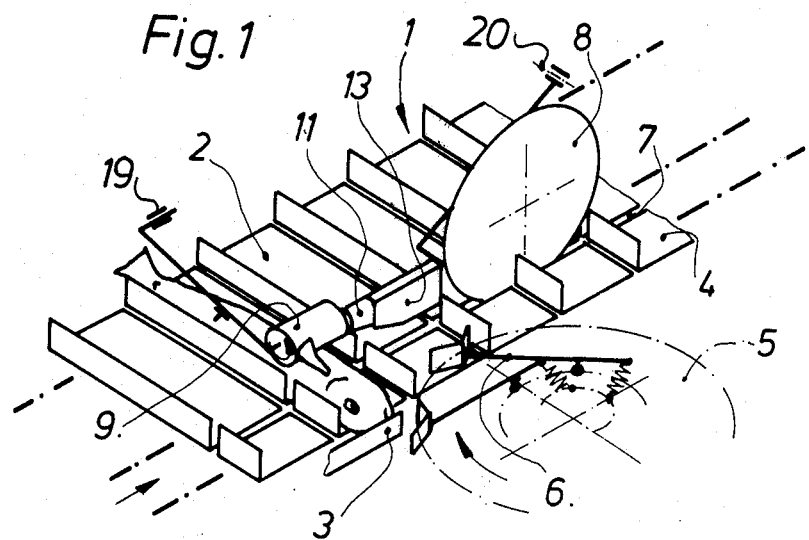
FIG. 1 is a portion of a decapitation device embodying one upper roller only and shown in axonometric representation.

In a frame, which is not shown, there is an endlessly rotatable conveyor 1 driven in a suitable manner comprising a chain of conveyor trays 2 with each of which there is associated a synchronously moving head support 4. Laterally adjacent to the pathway of the head supports 4 there is a known per se snout track 3 and, following this, a known type of rotary table 5 driven to rotate in synchronysm with the conveyor 1 serving as a displacement means which carries spring biassed displacement elements 6 each of which engages the snout of one the fish 15. A gap 7 is left between the conveyor trays 2 and the head-supports 4, into which gap the decapitation knife 8, which is only schematically illustrated, extends. Above the conveyor trays 2 a roller 9 is arranged in the vicinity of the gap 7 which rotates about an axis parallel to the conveying direction of the fish and is vertically yieldable about a swivel axis 19. The direction of rotation of this roller 9 is so chosen that the speed vector of its periphery directed towards the fish 15 is in the direction of the head 17 of the fish. The periphery of the roller 9 is roghened e.g. by the provision of fine grooves. Directly behind the roller 9 there is situated upstream of the decapitation knife 8 above the fish pathway a brake shoe 11 mounted vertically yieldably about a pivot axis 20 and in the form of a plate perpendicular to the surface on which the fish are received with a catching edge 12 directed towards the fish. At the junction between the roller 9 and the brake shoe 11 the latter is adapted to the cylindrical shape of the roller so that in this region the brake shoe 11 has a similar profile as the periphery of the roller 9. In the direction of the displacement of the fish 15 before the brake shoe 11 and parallel to it there is situated a guide track 13 having a rounded guide track edge 14 directed towards the fish and arranged higher by a few millimeters with respect to the catching edge 12 of the brake shoe 11, so that the distances of the catching edge 12 and the track edge 14 to the reception surface for the fish differ from each other. The end of the guide track 13 directed against the conveying direction of the fish is set back with respect to the entry end of the brake shoe 11.

According to FIG. 2 there is arranged a second roller 10 of the same surface structure as roller 9 and rotating in an opposite direction to it below the reception surface for the fish. In this case the reception surface is arranged as a surface 23 fixed to the machine and above which there slide conveying elements for transporting the fish, which non-shown elements are driven to rotate endlessly. The lower roller 10 is arranged opposite to the upper roller 9 and extends with its periphery through an aperture 21 in the reception surface 23 so that its periphery is closely adjacent to the latter. As may be taken from FIG. 3 the aperture 21 tapers in the conveying direction to form a gap 22 the width of which corresponds essentially to that of the gap 7, and of the space between the brake shoe 11 and the guide track 13.

Figure 3:
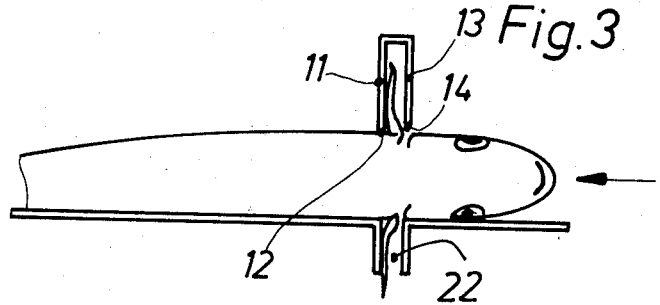
FIG. 3 shows a portion of a device according to FIG. 2, with a fish in the position after entry of the breast fins into the gap between the brake shoe and the guide track, resp. into the support plane.

The operation of the apparatus is as follows:

The fish 15 to be treated are so presented to the continuously driven conveyor 1 that they come to lie on their side with their snout contacting the snout track 3, their trunk resp. rear body portion 16 in the conveyor tray 2 and their head 17 on the head support 4. Whilst being conveyed the fish 15 come, as shown in FIG. 1, under the roller 9 driven in rotation about an axis parallel to the conveying direction which begins to erect the breast fins 18 by virtue of its gripping ability which is enhanced by the fine toothing on the periphery. By reason of the engagement of the fish with the snout track 3 the fish 15 retains its position. Thus prepared, the fish when conveyed further runs under the catching edge 12 of the brake shoe 11 so that at least the tip of the breast fin 18 which has already been loosened from its position close to the trunk 16 is erected and rests against the inner surface of the latter. While the fish subsequently comes into the region of the guide edge 14 of the guide track 13 it is displaced in the direction of its tail by the displacement element 6. As a consequence of this the breast fin 18 erects further against the inner surface of the brake shoe 11, as seen in FIG. 3, until the catching edge 12 engages the point of connection of the breast fin with the trunk 16. The growing reaction to the displacement can no longer be overcome by the displacement element 6 so that the fish stays in this position. Thus the guide track 13 prevents the fish from springing back when the displacement element 6 moves away from the fish shortly before the decapitation process.

Figure 2:
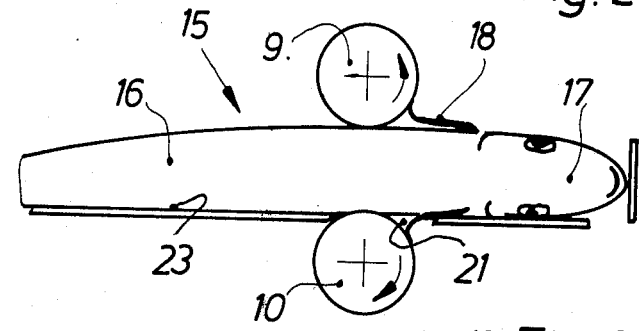
FIG. 2 shows a slightly altered embodiment of the device at a larger scale but comprising two rollers, with a fish in the position after running under the rollers for aligning the fins.

When the rollers are provided in pairs according to the embodiment of FIGS. 2 and 3 by using a second roller 10, the erection of the lower breast fin is performed in the gap 22, in an analog manner to the above described function of the brake shoe 11.

What I claim as my invention and desire to secure by Letters Patent is:

1. Apparatus for aligning fish in the position required for decapitation, said apparatus including means for conveying said fish lying on their side in a first or conveying direction essentially perpendicular to their longitudinal axis, a brake shoe having a catching edge adapted to slide along the body of said fish, and means for displacing said fish in a second or tail direction essentially perpendicular to said first direction, wherein a guide track is associated to said catching edge of said brake shoe upstream of said brake shoe when seen in said second direction of the longitudinal axis of the fish and forms a first unit with said brake shoe, said guide track having a guide edge directed, in use, toward said fish, and being spaced by a few millimeters in height over at least part of its length with respect to said catching edge, said catching edge and said guide edge together defining a gap extending in said first direction.

2. Apparatus as claimed in claim 1 wherein said brake shoe is adapted to yield in height.

3. Apparatus as claimed in claim 1 or 2 wherein said guide edge is rounded.

4. Apparatus as claimed in claim 1 or 2 wherein said catching edge has an end opposed to said first direction and said guide edge has an end opposed to said first direction, and said end of said catching edge lies upstream of said end of said guide edge when seen in said first direction.

5. Apparatus as claimed in claim 1 further including a second unit formed by a second brake shoe and a second guide track, said second unit being positioned essentially in the plane receiving the fish in a position substantially opposite to said first unit and corresponding to the position of said brake shoe and said guide track.

6. Apparatus as claimed in claim 1 including a first roller vertically yieldably disposed above said conveying means, said roller being spaced from said brake shoe in a direction opposed to said first direction, said roller being rotatable about an axis extending substantially parallel to said first direction, said roller having a periphery of which a part, in use, is directed towards said fish, said part of said periphery moving, in use, in a direction opposed to said second direction.

7. Apparatus as claimed in claim 6 wherein the periphery of said first roller is provided with a roughened surface.

8. Apparatus as claimed in claim 6 wherein a second roller is arranged below said plane receiving the fish in a position opposed to said first roller, said second roller being rotatable in a direction opposed to the direction of rotation of said first roller.

9. Apparatus as claimed in claim 8 wherein said second roller has a periphery provided with a roughened surface.

* * * * *